(12) United States Patent
Uppenkamp et al.

(10) Patent No.: US 12,728,514 B2
(45) Date of Patent: Sep. 8, 2026

(54) COOLING ATTACHMENT FOR A WORK MACHINE

(71) Applicant: SMS group GmbH, Düsseldorf (DE)

(72) Inventors: Nina Uppenkamp, Viersen (DE); Axel Rossbach, Korschenbroich (DE)

(73) Assignee: SMS group GmbH, Düsseldorf (DE)

( * ) Notice: Subject to any disclaimer, the term of this patent is extended or adjusted under 35 U.S.C. 154(b) by 221 days.

(21) Appl. No.: 18/688,830

(22) PCT Filed: Sep. 14, 2022

(86) PCT No.: PCT/EP2022/075568

§ 371 (c)(1),
(2) Date: Mar. 4, 2024

(87) PCT Pub. No.: WO2023/041604

PCT Pub. Date: Mar. 23, 2023

(65) Prior Publication Data

US 2024/0278372 A1 Aug. 22, 2024

(30) Foreign Application Priority Data

Sep. 15, 2021 (DE) ..................... 10 2021 210 224.7

(51) Int. Cl.
*B25D 17/20* (2006.01)
*B23Q 11/10* (2006.01)
(Continued)

(52) U.S. Cl.
CPC .............. *B25D 17/20* (2013.01); *B23Q 11/10* (2013.01); *B23Q 11/1015* (2013.01);
(Continued)

(58) Field of Classification Search
CPC ... B23Q 11/1015; B23Q 11/10; B23Q 11/126; B23Q 11/141; F28F 1/063; B23B 45/003; B25D 17/005; B25D 17/20; B25F 5/008
(Continued)

(56) References Cited

U.S. PATENT DOCUMENTS

| | | | |
|---|---|---|---|
| 2,554,568 | A | 5/1951 | Gillerstrom |
| 4,037,982 | A | 7/1977 | Clement |

(Continued)

FOREIGN PATENT DOCUMENTS

| | | |
|---|---|---|
| CH | 596946 | 3/1978 |
| DE | 1704296 U | 8/1955 |

(Continued)

*Primary Examiner* — Eric S Ruppert
*Assistant Examiner* — Hans R Weiland
(74) *Attorney, Agent, or Firm* — Smartpat PLC

(57) ABSTRACT

A cooling attachment can be releasably fastened to a work machine, which has a shaft in which a rod-like tool is guided with a rotary or hammering action and exits the shaft at a free end. The cooling attachment has a housing that encloses the work machine and in particular the shaft thereof and the tool that exits it, the latter only partially. Formed within the housing is a first cooling channel for conducting a coolant from an inlet opening to the tool exiting the free end of the housing shaft. In order to improve the cooling of the tool without cooling the workpiece to be machined, at least one connecting hole is provided, at the free end of the housing shaft, between the first cooling channel and a second cooling channel, in order to divert the coolant from the first cooling channel into the second cooling channel.

15 Claims, 3 Drawing Sheets

(51) Int. Cl.

| | |
|---|---|
| ***B23Q 11/12*** | (2006.01) |
| ***B23Q 11/14*** | (2006.01) |
| ***B25D 17/00*** | (2006.01) |
| ***B25F 5/00*** | (2006.01) |
| ***F28F 1/00*** | (2006.01) |

(52) U.S. Cl.
CPC .......... *B23Q 11/126* (2013.01); *B23Q 11/141* (2013.01); *B25D 17/005* (2013.01); *B25F 5/008* (2013.01); *F28F 1/003* (2013.01)

(58) Field of Classification Search
USPC .......................................................... 165/47
See application file for complete search history.

(56) References Cited

U.S. PATENT DOCUMENTS

| | | | |
|---|---|---|---|
| 4,293,045 | A | 10/1981 | Zeidman et al. |
| 5,332,343 | A | 7/1994 | Watanabe et al. |

FOREIGN PATENT DOCUMENTS

| | | | |
|---|---|---|---|
| DE | 4326253 | A1 | 2/1994 |
| DE | 19703094 | A1 | 8/1997 |
| DE | 10034794 | A1 | 2/2002 |
| JP | H0655402 | A | 3/1994 |
| JP | 2005028471 | A | 2/2005 |
| JP | 2020506072 | A | 2/2020 |
| WO | 0168302 | A1 | 9/2001 |
| WO | 2019068958 | A1 | 4/2019 |

COOLING ATTACHMENT FOR A WORK MACHINE

CROSS-REFERENCE TO RELATED APPLICATION

This application is a national stage application, filed under 35 U.S.C. § 371, of International Patent Application PCT/EP2022/075568, filed on Sep. 14, 2022, which claims the benefit of German Patent Application DE 10 2021 210 224.7, filed on Sep. 15, 2021.

BACKGROUND

Cooling attachments for work machines are generally known in the prior art, for example from the German published patent application DE 197 03 094 A1. The cooling attachment disclosed therein is used in particular for cooling a hand-held machine tool and in particular for cooling steel needles exiting a shaft of the hand-held machine tool, which are used for embossing or for removing surfaces from workpieces. Specifically, the cooling attachment disclosed therein has an outer housing in which continuous slots are arranged for the exit/inlet of a coolant. The housing is preferably made of less thermally conductive material, in particular plastic. In addition to the outer housing, the cooling attachment also has an inner housing that surrounds a work region of the work machine. In such work region of the work machine, there are impact transmission elements, rivet dies, which generate frictional heat during impact operation of the work machine, which contributes to the heating of the work machine. The inner housing is made of a material with relatively good thermal conductivity, which ensures sufficient dissipation of frictional heat from the work region of the work machine.

The cooling attachment known from the German published patent application is only designed to conduct the coolant either from the end close to the work machine to the free end of the housing and there to the tool to be cooled or in the opposite direction. This has the disadvantage that the cooling effect is not particularly high. In addition, if the coolant is fed to the tool to be cooled, it exits the cooling attachment near the workpiece to be machined and cools the workpiece.

SUMMARY

The disclosure relates to a cooling attachment for releasably fastening to a work machine, which has a shaft in which a rod-like workpiece is guided with a rotary or hammering action and exits the shaft at a free end. Furthermore, the disclosure relates to a device consisting of the work machine in combination with the cooling attachment in accordance with the disclosure along with a method for operating the specified device. Work machines within the meaning of the present disclosure are in particular needle embossers that, for the purpose of simplified traceability, are designed to emboss a data matrix/a code into a workpiece, in particular a forged workpiece after the forging process. However, work machines within the meaning of the disclosure can also be drills or cordless screwdrivers that drive a typically interchangeable tool, for example a screwdriver, a chisel or a embossing stamp. Depending on the tool, the work machine can be operated in a rotating or hammering working mode. Chisels or embossing stamps are typically operated by hammering, while screwdrivers are typically operated by rotation.

The disclosure improves a known cooling attachment for a work machine, a known device consisting of the work machine with the cooling attachment, a known method for operating the specified device and a method for producing the cooling attachment in such a manner that the cooling of the work machine and the tool driven by it is improved/made more effective, but at the same time cooling of the workpiece to be machined is prevented as far as possible.

This is achieved in that a second cooling channel running in the longitudinal direction of the housing is formed within the housing in order to conduct the coolant from the free end of the housing shaft to at least one outlet opening, which is also formed at the end of the housing close to the work machine, and in that at least one connecting hole is provided at the free end of the housing shaft between the two cooling channels in order to divert the coolant from the first into the second cooling channel.

The term " . . . at the free end" means "in the region of the free end."

Due to the claimed double channel guide and the connecting hole between the two channels, one of which is used as a supply line for the coolant to the tool to be cooled and the other as a return line for the coolant, the flow of the coolant in the return line can advantageously be influenced, advantageously swirled, by the flow of the coolant in the supply line, as a result of which its cooling effect on the tool, i.e. in particular an embossing needle, is improved. This also reduces wear on the tool and increases its usage/service life.

The tool, for example the needle of a needle embosser, can heat up to several 100° C. upon machining the forged workpieces that are still warm. Since the tool therefore requires particularly strong cooling, it is advantageous if the preferably swirled coolant with the improved cooling effect is first conducted to the tool to be cooled by the double channel guidance and deflection and only subsequently to the work machine to be cooled. Through the second/(return) channel, the coolant is advantageously also conducted past the region of the work machine where the heated drive of the work machine is located, which is cooled in this manner.

In addition to the specified swirling, the claimed deflection has the significant advantage that the coolant does not exit the cooling attachment in the region of the tool to be cooled—at least apart from small leakage losses—and undesirably cools the machined workpiece there; rather, it is instead diverted into the return line. The return line, that is the second cooling channel, ends at at least one outlet opening that is formed at the end of the housing close to the work machine, that is, opposite the free end and thus far away from the workpiece to be machined and possibly hot. In this respect, the design of the outlet openings there effectively prevents the undesired cooling of the workpiece.

In accordance with one embodiment, the specified advantageous swirling of the coolant is advantageously achieved—in addition to the specified deflection—by the fact that the at least one connecting hole is preferably designed in the form of a plurality of annularly arranged nozzle openings, which are not directed towards the central longitudinal axis of the cooling attachment, for example, but in each case tangentially towards the edge of a hole in the housing of the cooling attachment, through which the tool exits to the outside of the cooling attachment. This causes a circular, vortex-like flow of the coolant, as a result of which its cooling effect is improved. After absorbing the heat from the tool, the heated coolant flows within the second cooling channel to the outlet opening.

In accordance with a further advantageous exemplary embodiment, a plurality of outlet openings are arranged in a manner distributed over the circumference of the housing, in order to realize the largest possible cross-section for the outlet opening. The large cross-section is particularly advantageous in conjunction with a conical design of at least one of the outlet opening, in order to draw in the heated coolant through the first and second cooling channels and transport it outside the cooling attachment. A fan for introducing the coolant through the inlet openings into the cooling channels or for drawing in the coolant through the inlet opening into the cooling channels is advantageously unnecessary with such conical design of the outlet openings. The coolant flowing through the second cooling channel advantageously causes, on the one hand, a temperature insulation of the work machine, for example, of the needle embosser from the radiant heat of the possibly still hot workpiece, in particular the forged part, and on the other hand, such internal flow of the coolant also provides protection for the cooling attachment itself from the specified radiant heat.

A design of the housing shaft in such a manner that its free end runs conically towards the longitudinal axis of the housing offers the advantage that the coolant in such region is also directed from the radially further outer cooling channel through the at least one connecting hole towards the longitudinal axis of the housing and thus also towards the tool to be cooled exiting the shaft of the work machine. Such effect of the conical end of the housing shaft does not conflict with the fact that the coolant is directed tangentially towards the tool to be cooled if the connecting holes are aligned accordingly.

The aforementioned object is further achieved by a device that is a combination of the work machine and the cooling attachment. In principle, the advantages of this device are the same as those described above with reference to the claimed cooling attachment.

In accordance with an advantageous embodiment of the device, the cooling attachment has a cavity for receiving at least one part of the work machine. Such cavity is formed at the free end of the housing by a hole, the cross-section of which substantially corresponds to the cross-section of the tool exiting therefrom. Such formulation means that the hole is only larger than the cross-section of the tool to the extent that the tool can be moved through the hole without friction, but is not unnecessarily larger. Only the smallest possible gap should remain between the tool and the housing of the cooling attachment, in order to ensure that as little coolant as possible can exit the housing through such gap, see above: leakage losses. The exit of the coolant through the gap is also ensured by the circular vortex-like flow of the coolant described above and the suction generated by the large conical exit openings in the upper region of the cooling attachment. Thus, it is ensured in a variety of ways that the temperature of the workpiece machined by the tool, for example a forged part that is still hot, is not reduced in an undesirable manner, but that instead the tool and the work machine driving the tool are cooled to a sufficient extent.

Finally, the object of the disclosure is achieved by the method for operating the device and a method for producing the cooling attachment. Due to its complex geometry, the cooling attachment is particularly advantageously produced using a 3D printing method. Geometrically, the cooling attachment is optimized according to the additive method/manufacturing restrictions, such that it can be used almost directly from the printer. This means that no support structures are required, which would have to be laboriously removed later, and only a threaded hole for the air connection will be required as mechanical post-machining. Otherwise, the advantages of the methods correspond to the advantages previously mentioned with reference to the claimed cooling attachment and the claimed device.

DETAILED DESCRIPTION

The invention is described in detail below with reference to the specified figures in the form of exemplary embodiments. In all figures, the same technical elements are designated with the same reference signs.

Figure 1:
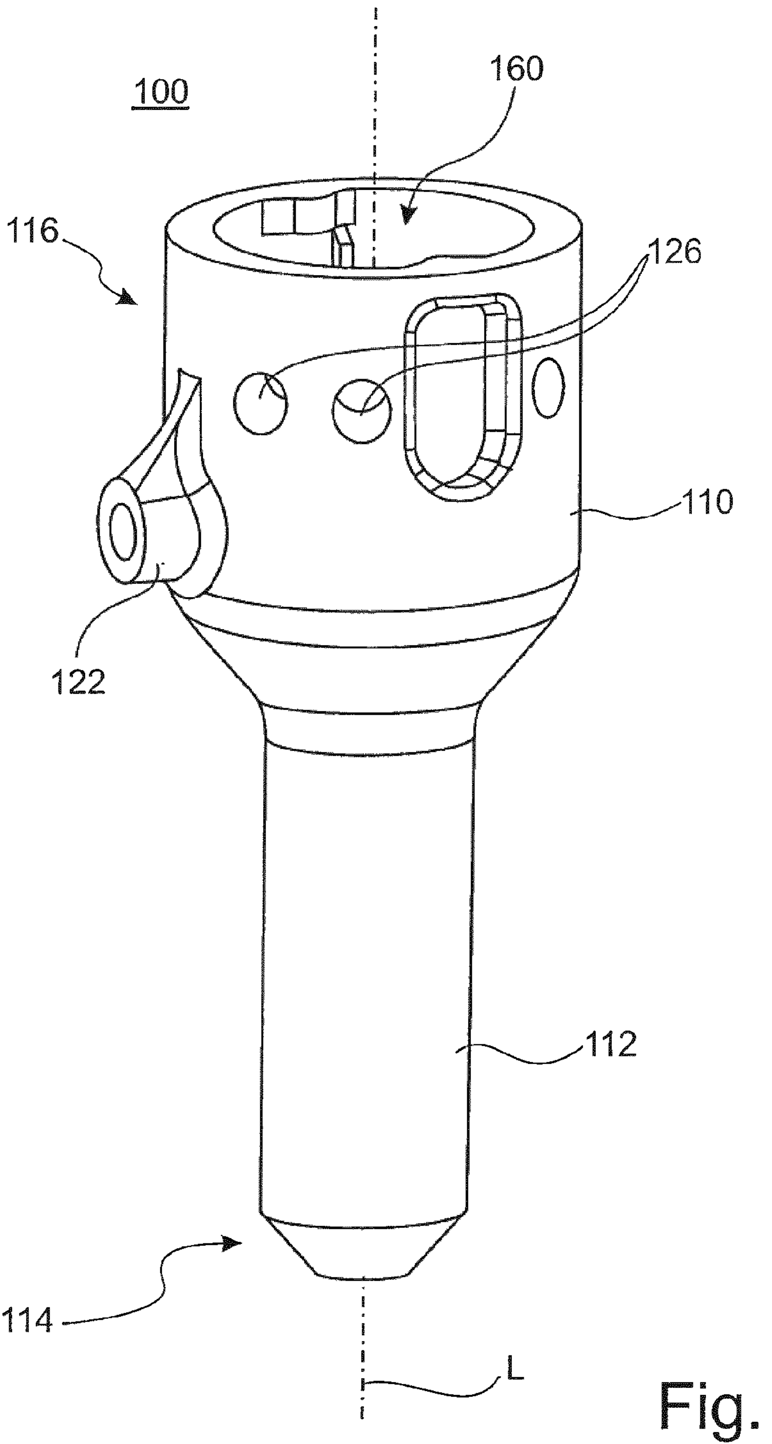
FIG. 1 shows an external perspective view of a cooling attachment.

FIG. 1 shows an external perspective view of the cooling attachment 100. The cooling attachment has a housing 110 with a shaft 112. The housing with the housing shaft is formed with a cavity 160 for releasably receiving a work machine 200, typically also with a shaft 210; see FIG. 2. The free end of the housing shaft 112 is preferably designed to be conically tapered towards the longitudinal axis L of the cooling attachment. At its end 116 close to the work machine, which is opposite the free end 114 at a distance, the housing 110 of the cooling attachment 100 has an inlet opening 122 and preferably a plurality of outlet openings 126 for a coolant for cooling the possibly received work machine 200 and a rod-like tool 300 exiting the shaft 210 of the work machine and the housing shaft 112; see FIG. 2.

Figure 2:
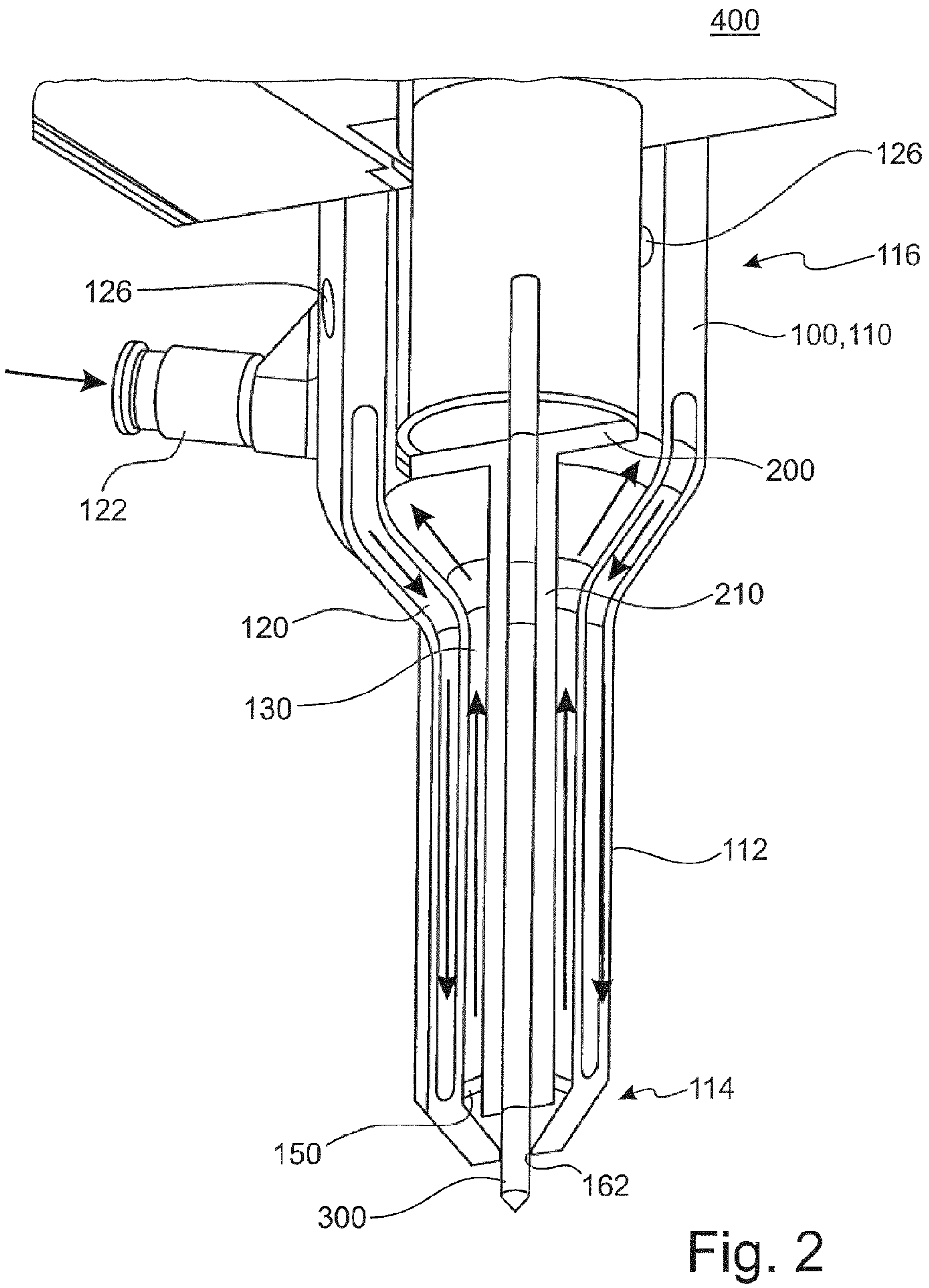
FIG. 2 shows a longitudinal section of a device including a work machine and a cooling attachment.

FIG. 2 shows the device 400, which shows the cooling attachment 100 placed on the work machine 200. In other words, the device 400 refers to the work machine 200 if it is received in the cavity 160 of the cooling attachment 100. The shaft 210 of the work machine 200 is then also received by the shaft 112 of the housing 110 and the tool 300 driven by the work machine 200 exits a hole 162 at the free end 114 of the housing shaft 112. The tool 300 is driven in rotation by the work machine 200 or moved up and down by hammering along the longitudinal axis L of the housing 110, which coincides with the longitudinal axis of the shaft 210 of the work machine.

In the longitudinal section through the device 400 shown in FIG. 2, it can be seen that here a first cooling channel 120 extending in the longitudinal direction of the housing is formed in the outer wall of the housing 110 of the cooling attachment in order to conduct a coolant from the inlet opening 122 at the end 116 close to the work machine to the free end 114 of the housing shaft for cooling the rod-like tool 300 there. At least one connecting hole 150 is arranged within the free end of the housing shaft 112, which is preferably designed in the form of a plurality of annularly arranged nozzle openings, in order to divert the incoming coolant there into a second cooling channel 130 after it impacts the tool 300 to be cooled. The nozzle openings are preferably not centered on the longitudinal axis L of the housing/the tool 300, but are directed tangentially to the edge of the hole 162/tangentially to the tool 300, for example the needle of a needle embosser. The tangential direction of the nozzle openings and thus of the coolant flow causes swirling and thus, advantageously, an improved cooling effect of the coolant flow. The second cooling channel 130 guides the coolant from the free end 114 back to the end 116 of the housing 110 close to the work machine, so that it can exit the outlet openings 126 there. The outlet openings 126 are preferably designed to be conical, in order to draw the coolant through the inlet opening 122 and the first cooling channel 120 into the second cooling channel 130.

As can be seen in FIG. 2, the first cooling channel 120 and the second cooling channel 130 are preferably in each case designed as an annular channel and they preferably run coaxially to one another. While the first cooling channel 120 is formed entirely within the wall of the housing 110, the second cooling channel 130 is only partially bounded by a wall radially remote from the longitudinal axis L of the housing 110 as part of the housing 110. The second cooling channel of the cooling attachment is open towards the longitudinal axis L of the housing in another, radially more inner part, that is, it is not bounded by the housing 110 itself. Instead, the boundary of the second cooling channel is formed there by the outer surface of the work machine 200 and in particular the shaft 210 thereof itself. That is, while the coolant flows in the second cooling channel 130 to the outlet openings 126, it automatically flows along the work machine 200 and the shaft 210 thereof and cools such parts in this manner.

Figure 3:
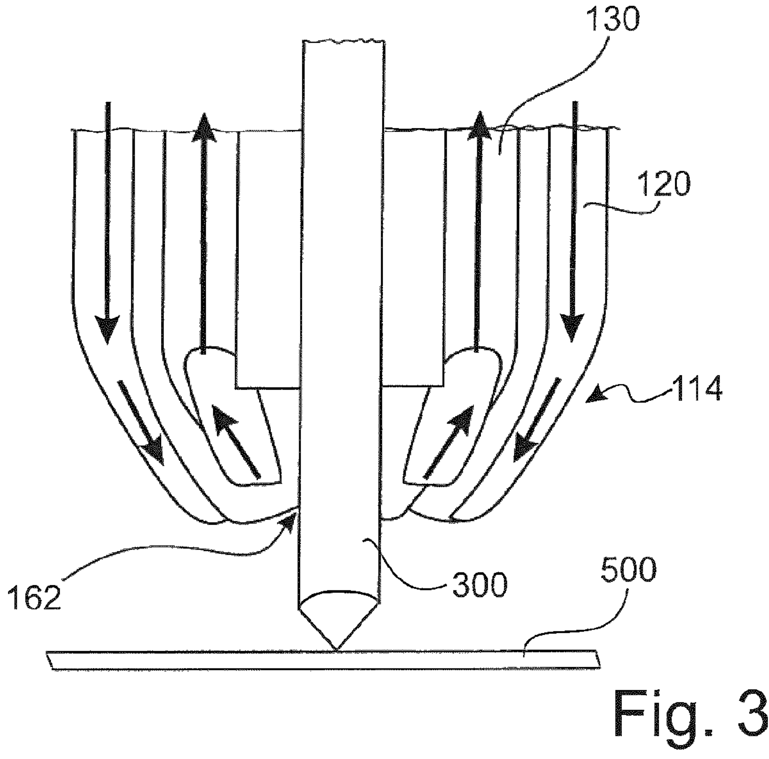
FIG. 3 shows the device at its free end in an enlarged view of FIG. 2.

FIG. 3 shows an enlarged view of the free end of the housing shaft 114 in accordance with FIG. 2. It can be seen that the tool 300 exits the free end 114 of the housing shaft, in order to machine the workpiece 500.

Figure 4:
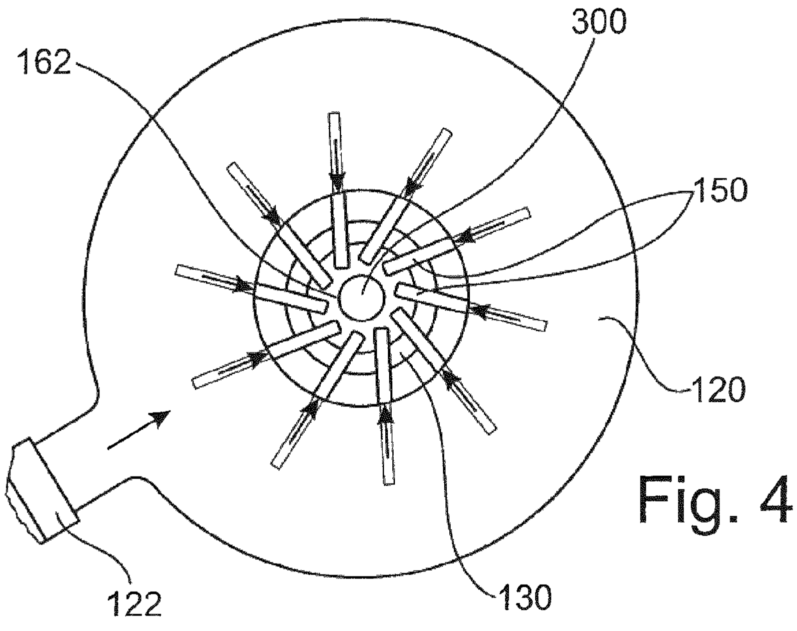
FIG. 4 shows the device in a cross-section.

FIGS. 3 and 4 show that the hole 162 has a cross-section that substantially corresponds to the cross-section of the tool 300 passing through it. The gap between the tool 300 and the edge of the hole 162 should be as small as possible, so that the coolant is prevented from exiting through such gap as far as possible. In this manner, undesired cooling of the workpiece 500 to be machined is prevented.

FIG. 4 shows the introduction of the coolant through the inlet opening 122 into the first cooling channel 120, which is designed as an annular channel. In the center of FIG. 4, it can be seen that the annularly arranged connecting holes/nozzle openings 150 in the free end 114 of the shaft 112 of the housing 110 are not aligned exactly radially to the longitudinal axis L of the housing, but are aligned tangentially to the edge of the hole 162/the edge of the workpiece 300, in order to achieve the desired swirling of the coolant there. In this respect, FIG. 4 shows a cross-section through the cooling attachment not only in a plane in the region of the end 116 of the housing close to the work machine at the level of the inlet opening 122, but also in a plane in the free end 114 of the housing shaft 112.

LIST OF REFERENCE SIGNS

100 Cooling attachment
110 Housing
112 Housing shaft
114 Free end of the housing shaft
116 End of the cooling attachment close to the work machine
120 First cooling channel
122 Inlet opening
126 Outlet opening
130 Second cooling channel
150 Connecting hole
160 Cavity
162 Edge of the hole
200 Work machine
210 Shaft of the work machine
300 Rod-like tool
400 Device
500 Workpiece
L Longitudinal axis of the housing

The invention claimed is:

1. A cooling attachment (100) for releasably fastening to a work machine (200), the work machine (200) having a rod-shaped tool (300) that is guided for a rotary or hammering action within a shaft (210) and exits the shaft at a free end, the cooling attachment (100) comprising:
- a housing (110) with a housing shaft (112) for releasable mounting on the shaft (210) of the work machine,
  - wherein the housing shaft has a free end (114) for at least partially enclosing the free end of the shaft of the work machine and the tool (300) exiting therefrom;
- a first cooling channel (120) extending in a longitudinal direction of the housing formed within the housing for conducting a coolant from an inlet opening (122) at an end (116) of the housing (110) close to the work machine to the free end of the housing shaft for cooling the rod-shaped tool (300);
- a second cooling channel (130) extending in the longitudinal direction of the housing (110) formed within the housing for conducting the coolant from the free end (114) of the housing shaft to at least one outlet opening (126), which is formed at the end (116) of the housing close to the work machine; and
- at least one connecting hole (150) at the free end of the housing shaft (112) between the first cooling channel (120) and the second cooling channel (130) for diverting the coolant from the first cooling channel (120) into the second cooling channel (130),
- wherein the first cooling channel (120) and the second cooling channel (130) are coaxial annular channels.

2. The cooling attachment (100) according to claim 1, wherein the first cooling channel (120) is formed within an outer wall of the housing (110); and wherein the second cooling channel (130) is formed radially further inside than the first cooling channel (120) within the housing (110).

3. The cooling attachment (100) according to claim 2, wherein the second cooling channel (130) is only partially bounded by a wall radially remote from a longitudinal axis (L) of the housing as part of the housing and is open towards the longitudinal axis (L) of the housing in another, radially more inner part.

4. The cooling attachment (100) according to claim 1, wherein the cooling attachment has a cavity (160) for receiving the shaft (210) of the work machine (200), and for passage of the tool (300) at the free end (114) of the housing shaft (112); and wherein the at least one connecting hole (150) is formed tangentially to an edge of the cavity from the first cooling channel.

5. The cooling attachment (100) according to claim 1, wherein a plurality of outlet openings (126) are arranged in a manner distributed over a circumference of the housing (110).

6. The cooling attachment (100) according to claim 1, wherein the at least one outlet opening (126) is designed to be conical.

7. The cooling attachment (100) according to claim 1, wherein the free end of the housing shaft (112) is designed to be conically tapered towards a longitudinal axis (L) of the housing.

8. A device (400), comprising:
a work machine (200) with a shaft (210), in which a rod-shaped tool (300) is guided with a rotary or hammering action, wherein the rod-shaped tool exits a free end of the shaft (210) of the work machine; and
a cooling attachment (100), comprising
a housing (110) with a housing shaft (112) for releasable mounting on the shaft (210) of the work machine,
wherein the housing shaft has a free end (114) for at least partially enclosing the free end of the shaft of the work machine and the tool (300) exiting therefrom;
a first cooling channel (120) extending in a longitudinal direction of the housing formed within the housing for conducting a coolant from an inlet opening (122) at an end (116) of the housing (110) close to the work machine to the free end of the housing shaft for cooling the rod-shaped tool (300);
a second cooling channel (130) extending in the longitudinal direction of the housing (110) formed within the housing for conducting the coolant from the free end (114) of the housing shaft to at least one outlet opening (126), which is formed at the end (116) of the housing close to the work machine; and
at least one connecting hole (150) at the free end of the housing shaft (112) between the first cooling channel (120) and the second cooling channel (130) for diverting the coolant from the first cooling channel (120) into the second cooling channel (130),
wherein a radially inner wall of the second cooling channel (130) is formed by an outer wall of the work machine (200) and by an outer wall of the tool (300), where the tool (300) exits the shaft (210) of the work machine.

9. The device (400) according to claim 8,
wherein at least a part of the work machine (200) is received in a cavity (160) of the cooling attachment (200).

10. The device (400) according to claim 9,
wherein the cavity (160) at the free end of the housing shaft is formed by a hole (162), a cross-section of which substantially corresponds to a cross-section of the tool (300) exiting therefrom.

11. The device (400) according to claim 10,
wherein the connecting hole (150) between the first cooling channel (120) and the second cooling channel (130) at the free end (114) of the housing shaft is directed tangentially towards the tool (300) exiting the shaft (210) of the work machine (200).

12. A method, comprising:
providing
a work machine (200) with a shaft (210), in which a rod-shaped tool (300) is guided with a rotary or hammering action, wherein the rod-shaped tool exits a free end of the shaft (210) of the work machine, and
a cooling attachment (100), comprising
a housing (110) with a housing shaft (112) for releasable mounting on the shaft (210) of the work machine,
wherein the housing shaft has a free end (114) for at least partially enclosing the free end of the shaft of the work machine and the tool (300) exiting therefrom;
a first cooling channel (120) extending in a longitudinal direction of the housing formed within the housing for conducting a coolant from an inlet opening (122) at an end (116) of the housing (110) close to the work machine to the free end of the housing shaft for cooling the rod-shaped tool (300);
a second cooling channel (130) extending in the longitudinal direction of the housing (110) formed within the housing for conducting the coolant from the free end (114) of the housing shaft to at least one outlet opening (126), which is formed at the end (116) of the housing close to the work machine; and
at least one connecting hole (150) at the free end of the housing shaft (112) between the first cooling channel (120) and the second cooling channel (130) for diverting the coolant from the first cooling channel (120) into the second cooling channel (130); and
introducing the coolant through the inlet opening (122) in the housing (110) of the cooling attachment (100) into the first cooling channel (120),
wherein the coolant is air, and
wherein the coolant is directed through the first cooling channel onto the tool (300) exiting the shaft (210) of the work machine and is deflected there into the second cooling channel (130), for cooling the tool and the work machine (200) and for exiting the second cooling channel (130) from the at least one outlet opening (126) attached at the end (116) on a work machine side of the housing (110).

13. The method according to claim 12,
wherein the coolant flows turbulently during its return path in the second cooling channel (130).

14. The method according to claim 12,
wherein the at least one outlet opening (126) is conical, and
wherein the coolant is drawn at least into the second cooling channel (130) towards the at least one outlet opening (126).

15. A method, comprising:
producing the cooling attachment (100) in accordance with claim 1 by 3D printing.

* * * * *